Patented June 6, 1939

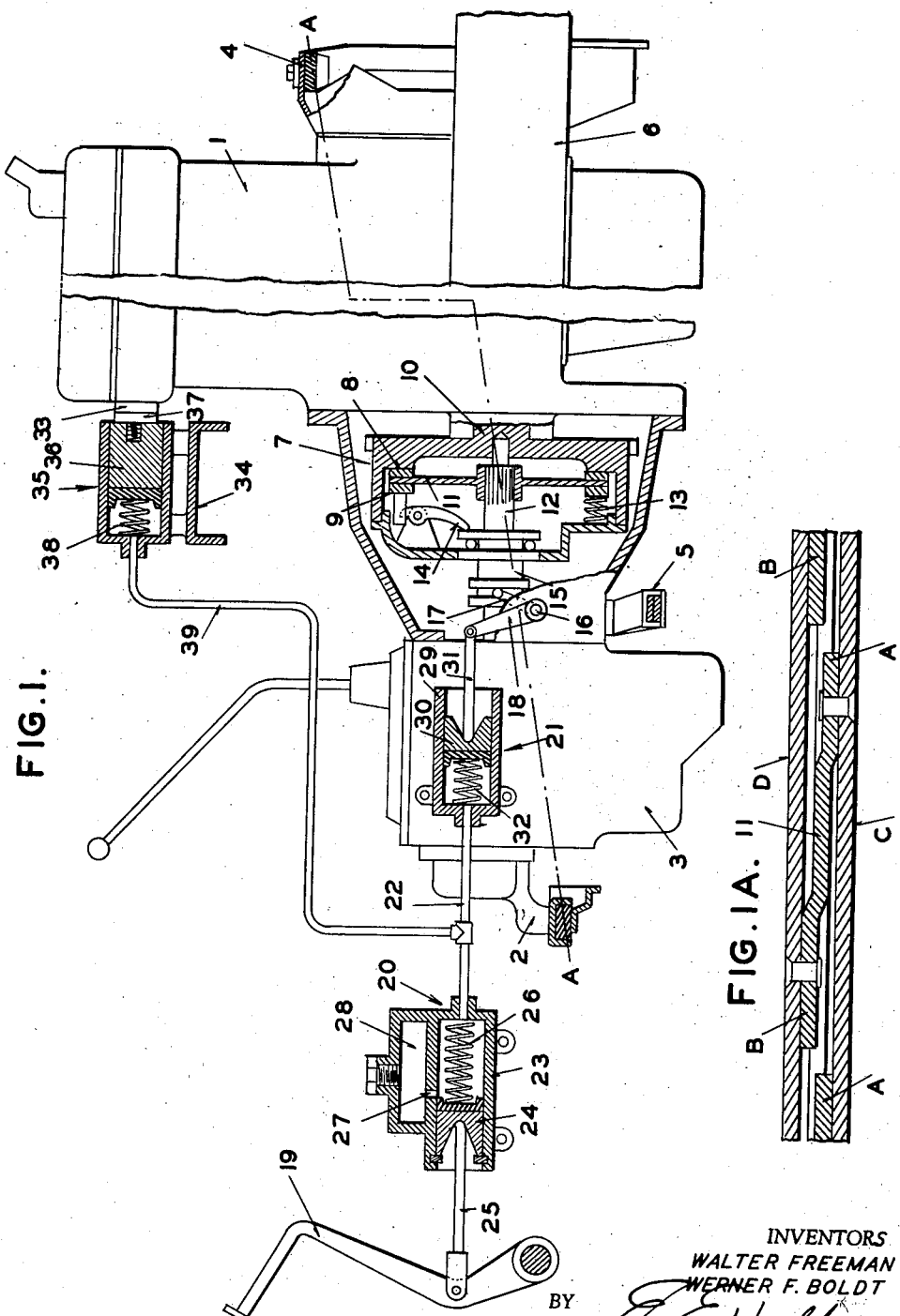

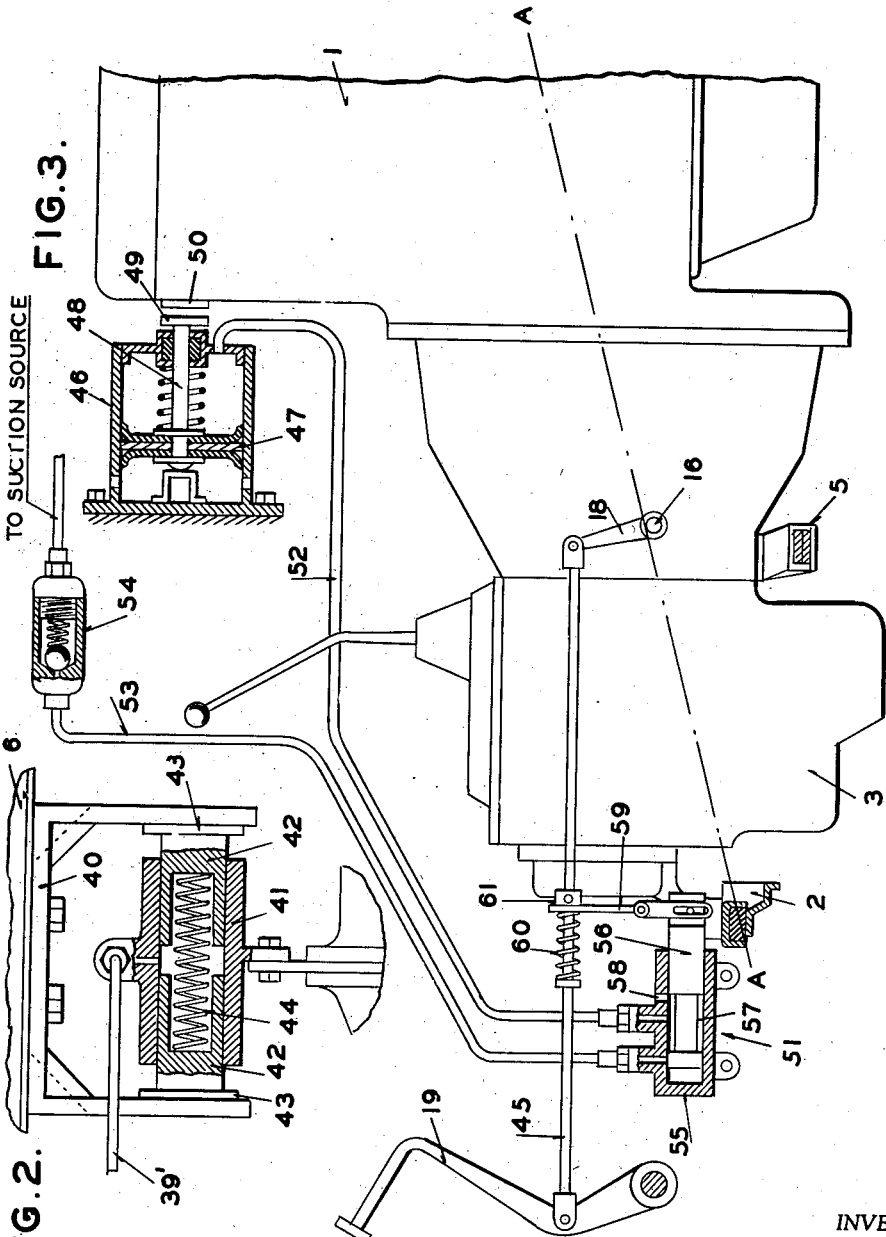

2,161,670

UNITED STATES PATENT OFFICE 2,161,670

CLUTCH CHATTER ELIMINATOR

Walter R. Freeman, University City, and Werner F. Boldt, Overland, Mo., assignors to Wagner Electric Corporation, St. Louis, Mo., a corporation of Delaware Application August 12, 1937, Serial No. 158,626
Renewed April 26, 1939

12 Claims. (Cl. 180—64)

Our invention relates to improvements in the operation of clutches associated with internal combustion engines which are resiliently mounted for limited oscillation about a longitudinal axis during their operation.

One of the objects of our invention is to provide means for damping the oscillations or vibrations of an internal combustion engine of the type referred to when the clutch mechanism associated therewith is being moved from and to engaged position, thus decreasing the possibility of clutch chatter which may otherwise be present during the actuation of the clutch and resulting from vibrations of the engine being transmitted thereto.

Another object of our invention is to so associate two cooperating frictional surfaces with an internal combustion engine and its frame that they will be engaged to dampen the engine vibration when the clutch mechanism associated with the engine is operated.

Still another object of our invention is to provide a dampener for a resiliently mounted engine which will become effective to reduce the vibrations of the engine at a rate substantially proportional to the rate of decrease of torque transmittable by the clutch faces at any time during their disengagement and which will become ineffective at a rate substantially proportional to the rate of increase of torque transmittable by the clutch faces at any time during their reengagement.

Other objects will become apparent from the following description taken in connection with the accompanying drawings in which Figure 1 is a side view, partly in section, of an internal combustion engine and a clutch mechanism having our invention associated therewith, the hydraulic clutch actuating mechanism being schematically shown; Figure 1A is a detailed cross-sectional view of the clutch plate; Figure 2 is a top view, partly in section, of a modified structure; and Figure 3 is a view similar to Figure 1 showing another modification in which the clutch is mechanically actuated.

Referring to Figure 1, the internal combustion engine I which is illustrated is of well-known construction and is mounted at only two points, one of which is at the rear or driving end of the engine and the other at the front end of the engine. The support for the rear end is shown at 2 positioned behind the change speed gearing 3 and the support for the front end is shown at 4 near the front end of the engine. The supports are on an inclined axis A—A which passes through the center of gravity of the engine. The engine during its operation is free to oscillate about the axis A—A, excessive movement being damped by the leaf spring 5. The mountings are set in rubber to decrease the vibration transmitted to the frame 6 of the vehicle.

Between the engine and the gearing is interposed the usual friction clutch 7 having relatively movable elements 8 and 9 carried by the engine shaft 10 and another element 11 carried on the shaft 12 leading to the gearing. The element 11 is positioned between elements 8 and 9 and as shown in Figure 1A it is provided with the usual resilient fingers A and B which carry the friction faces C and D. All the clutch elements are adapted to be held in engagement by the clutch engaging springs 13 (only one being shown). The clutch elements are disengaged by the throw-out levers 14 (only one being shown) which are actuated by the sleeve 15 slidable on shaft 12, the sleeve in turn being moved by the clutch shaft 16 journaled in the clutch housing and having the usual arms 17 engaging the sleeve and an exterior arm 18.

For controlling the clutch mechanism by a pedal 19 positioned at a remote point, we have shown a hydraulic system comprising a compressor 20 and a fluid motor 21 connected together by a conduit 22. The compressor consists of a cylinder 23 having reciprocable therein a piston 24 connected to the pedal by a piston rod 25. The piston is normally biased to its retracted position by a spring 26 where it uncovers a port 27 for placing the reservoir 28 in communication with the cylinder in order to permit expansion and contraction of the liquid and to also maintain the system filled with liquid at all times. The motor 21 consists of a cylinder 29 having a piston 30 therein connected to the clutch shaft arm 18 by the rod 31. A spring 32 maintains the piston 30 in constant engagement with the rod.

In accordance with our invention the rear end of the engine block is provided with a friction surface 33 and mounted upon a suitable support 34 adjacent the friction surface is a fluid motor 35 having a piston 36. The support 34 may be either carried by frame 6 of the vehicle or some part of the body which is attached to the frame. The outer end of piston 36 is provided with a friction surface 37 for cooperation with surface 33, the surfaces being maintained in light contact by a relatively weak spring 38 in the motor and acting on piston 36. The fluid motor 35 is connected by a conduit 39 to conduit 22 of the hydraulic actuating system for the clutch.

Referring to the operation, when the parts are in the position shown, the clutch will be engaged under the action of springs 13 and the engine when operating will oscillate about the axis A—A in a well-known manner. When the clutch pedal is depressed to disengage the clutch during gear changing or for any other purpose, the compressor piston 24 will be moved forwardly and when port 27 is cut off the liquid in the system will be placed under pressure and will be effective to operate piston 30 of motor 21 and also piston 36 of damping motor 35. Movement of piston 30 will result in the clutch shaft 16 being rotated and the clutch disengaged against clutch springs 13. Simultaneously, the movement of piston 36 will place the friction surfaces 37 and 33 in tight frictional contact and either decrease the amplitude and rate of oscillation of the engine or completely stop the oscillation. Preferably, the size of motor 35 is so designed in comparison with the other parts that the amplitude and rate of oscillations will only be decreased to a desired point where they will not seriously affect the operation of the clutch. The damping effect will begin as soon as the fluid in the system is placed under pressure and before sufficient pressure is developed to disengage the clutch. As the pressure in the system builds up during clutch disengagement the damping effect also increases. The rate of increase of the damping effect is thus substantially proportional to the rate of decrease of torque transmittable by the clutch faces at any time during their disengagement. At the time of full clutch disengagement the oscillations of the engine resulting in vibrations being transmitted to the clutch will, therefore, be considerably lessened or even eliminated.

When the clutch is permitted to reengage by the release of pressure on the clutch pedal, the elements 8, 9 and 11 will first be brought into contact and then as the fluid pressure in the system decreases springs 13 become effective to compress the friction faces C and D on element 11 against the action of spring fingers A and B. Simultaneously with the clutch engagement, the pressure between the frictional surfaces of the dampener decreases due to the decrease of fluid pressure in the system. The ineffectiveness of the damping motor, therefore, decreases substantially proportionally to the torque being transmittable by the clutch at any time during reengagement of its clutch faces. It is thus seen that there is no serious vibration being transmitted from the engine to the clutch during its reengagement due to the damping of the engine's oscillation. Any clutch chatter which would ordinarily be caused by the oscillation of the engine, will be eliminated and a much smoother clutch engagement will be present.

Referring to Figure 2, we have shown a modified construction wherein the damping fluid motor is associated with the engine and the frame of the vehicle in a different manner. The frame 6 of the engine is provided with a U-shaped bracket 40 and the side of engine 1 adjacent the junction of the engine block and clutch housing carries a cylinder 41 positioned between the legs of the bracket. Two oppositely movable pistons 42 are mounted in the cylinder and the outer ends are provided with friction surfaces 43 adapted to be held in light contact with the legs of the bracket by a weak spring 44 interposed between the piston. The cylinder is connected to the hydraulic actuating system of the clutch by the conduit 39' in the same manner as in Figure 1. The axes of the pistons 42 are preferably positioned parallel with the axis A—A of the engine and the inner surfaces of the legs of the bracket which cooperate with the ends of the pistons are preferably in a plane at right angles to the axis A—A.

The operation of the modification shown in Figure 2 is the same as that of Figure 1. When the clutch is disengaged the friction surfaces on the ends of the pistons will be moved into tight frictional contact with the inner surfaces of the legs of the bracket and thus either decrease the amplitude and rate of oscillation of the engine or completely stop the oscillation. By having the two pistons cooperating with the legs of the bracket in the manner shown there is no thrust set up by the operation of the fluid motor which would be effective on the engine tending to shift it relative to its mountings.

Referring to Figure 3, we have shown how our invention may be associated with a mechanically-actuated clutch instead of a hydraulically-actuated one. The engine and clutch mechanism is the same as that shown in Figure 1. The arm 18 on clutch shaft 16 is directly connected to the clutch pedal 19 by a rod 45. A suction-operated motor 46 is secured to a suitable support at the rear of the engine and reciprocable therein is a piston 47 having a piston rod 48 carrying a friction plate 49 at its outer end and positioned adjacent the friction surface 50 on the engine block. The suction motor is connected to a control valve 51 by a conduit 52 and this valve in turn is connected to a source of suction, preferably the engine manifold, by a conduit 53, which has a check valve 54 associated therewith to prevent any back pressure in the engine from affecting the mechanism. The valve 51 is mounted adjacent the clutch control rod 45 and comprises a casing 55 and a sliding valve element or stem 56. This stem is formed with an annular groove 57 whereby the stem when in one position can connect conduit 52 with conduit 53 and in another position can connect conduit 52 with an atmospheric port 58. The exterior end of the valve is connected to one end of a lever 59 which has its other end forked and interposed between a spring 60 and a shoulder 61 on rod 45.

When the clutch pedal is in a position where the clutch is engaged, the valve stem will be held in a position where the suction motor 46 will be connected to atmosphere and friction plate 49 and the friction surface will not be in contact. When the clutch is disengaged, the valve stem will be moved by rod 45 and lever 59 to a position where the suction motor will be connected to the source of suction and become operative to force plate 49 into tight frictional engagement with surface 50 thereby damping the oscillation of the engine in a manner similar to that done by the structure shown in Figure 1. Reengagement of the clutch will again place the suction motor in communication with the atmosphere through the valve and thus permit the engine to assume its oscillation.

Being aware of the possibility of modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. In a motor vehicle, a support, an engine resiliently mounted on said support and subject to vibrations during its operation, a clutch associated with the engine, actuating means for the clutch, and means operable by said clutch actuating means for damping the engine vibrations.

2. In a motor vehicle, a support, an engine resiliently mounted on said support and subject to vibrations during its operation, friction means for damping said vibrations, a clutch mechanism, means for actuating said clutch mechanism, and means operable by said actuating means operating said friction damping means.

3. In a motor vehicle, a support, an engine mounted on said support for limited oscillation about a longitudinal axis during its operation, a clutch mechanism associated with the engine, cooperating frictional surfaces carried by the support and by the engine at a point spaced from said axis, means for actuating the clutch mechanism, and means operable by said actuating means for causing said frictional surfaces to so engage each other as to damp the oscillations of the engine.

4. In a motor vehicle, a support, an engine mounted on said support for limited oscillation about a longitudinal axis during its operation, a clutch mechanism associated with the engine, cooperating relatively movable frictional surfaces carried by the support and by the engine at a point spaced from said axis, means for actuating the clutch mechanism, and fluid pressure operated means controlled by the clutch actuating means for forcing said cooperating frictional surfaces into contact with each other to thereby damp the oscillations of the engine.

5. In a motor vehicle, a support, an engine mounted on said support for limited oscillation about a longitudinal axis during its operation, a clutch mechanism associated with the engine, cooperating relatively movable frictional surfaces carried by the support and by the engine at a point spaced from said axis, means for actuating the clutch mechanism and comprising a fluid motor and a source of pressure connected thereto, a fluid motor for moving the frictional surfaces into pressure engagement with each other, and means for placing said last named fluid motor in communication with the source of pressure which actuates the clutch mechanism.

6. In a motor vehicle, a support, an engine mounted on said support for limited yieldable oscillation about a longitudinal axis during its operation, a clutch mechanism associated with the engine and subject to vibrations from the oscillation of the engine, means carried by said engine and provided with a frictional surface, a member carried by the support and provided with a frictional surface adjacent the first named frictional surface, a fluid pressure system for disengaging the clutch mechanism and permitting its reengagement, a fluid motor for causing said frictional surfaces to so engage each other as to damp the oscillations of the engine, and means for operating said fluid motor simultaneously with the fluid pressure system of the clutch mechanism.

7. In a motor vehicle, a support, an engine mounted on said support for limited oscillation about a longitudinal axis during its operation, a clutch mechanism associated with the engine, cooperating frictional surfaces carried by the support and by the engine at a point spaced from said axis, means for actuating the clutch mechanism, a suction motor for causing said frictional surfaces to so engage each other as to damp the oscillations of the engine, a source of suction, and valve means operable by the clutch actuating means for placing said suction motor in communication with the source of suction.

8. In mechanism of the class described, a support, an engine resiliently mounted on the support and subject to vibrations during its operation, a clutch mechanism for connecting the engine to and disconnecting it from a member to be driven, actuating means for the clutch mechanism, and means operably associated with the actuating means for reducing the vibrations of the engine at the time of engagement of the clutch.

9. In mechanism of the class described, a support, an engine resiliently mounted on the support and subject to vibrations during its operation, a clutch mechanism for connecting the engine to and disconnecting it from a member to be driven, means for damping the vibrations of the engine, actuating means for the clutch mechanism, and means associated with the actuating means and operable simultaneously with the engagement of the clutch for causing said damping means to be ineffective at a rate substantially proportional to the rate of increase of the torque transmittable at any time by thec lutch mechanism.

10. In mechanism of the class described, a support, an engine resiliently mounted on the support and subject to vibrations during its operation, a clutch mechanism for connecting the engine to and disconnecting it from a member to be driven, actuating means for the clutch mechanism, and means operably associated with the actuating means for reducing the vibrations of the engine at the time of disengagement of the clutch and at a rate substantially proportional to the rate of decrease of the torque transmittable at any time by the clutch mechanism.

11. In mechanism of the class described, a support, an engine resiliently mounted on the support and subject to vibrations during its operation, a clutch mechanism for connecting the engine to and disconnecting it from a member to be driven, means for actuating the clutch mechanism and comprising a fluid motor and a source of pressure connected thereto, frictional means for damping the vibrations of the engine, and means for operating said frictional damping means by the clutch actuating mechanism during engagement and disengagement of the clutch mechanism, said frictional damping means adapted to become ineffective to damp the vibrations at a rate substantially proportional to the rate of increase of the torque being transmittable by the clutch mechanism at any time during clutch engagement.

12. In mechanism of the class described, a support, an engine resiliently mounted on the support and subject to vibrations during its operation, a clutch mechanism for connecting the engine to and disconnecting it from a member to be driven, means for actuating the clutch mechanism and comprising a fluid motor and a source of pressure connected thereto, frictional means for damping the vibrations of the engine, and means for operating said frictional damping means by the clutch actuating mechanism during engagement and disengagement of the clutch mechanism, said frictional damping means adapted to become effective to damp the vibrations of the engine at a rate substantially proportional to the rate of decrease of the torque being transmittable by the clutch mechanism at any time during its disengagement.

WALTER R. FREEMAN.
WERNER F. BOLDT.